(12) United States Patent
Kang et al.

(10) Patent No.: US 7,514,498 B2
(45) Date of Patent: Apr. 7, 2009

(54) FILMS OR STRUCTURAL EXTERIOR MATERIALS USING COATING COMPOSITION HAVING SELF-CLEANING PROPERTY AND PREPARATION METHOD THEREOF

(75) Inventors: Yang Gu Kang, Daejeon (KR); Seung Heon Lee, Daejeon (KR); Young Jun Hong, Daejeon (KR); Jung Hoon Kim, Cheongju-si (KR); Hye Jeong Lee, Suwon-si (KR); Sang Ho Shin, Cheongju-si (KR); Sung Hoon Jang, Daejeon (KR); Hong Cheul Shin, Seoul (KR); Yeong Rae Chang, Daejeon (KR); Yeon Bin Lee, Seoul (KR)

(73) Assignee: LG Chem Ltd., Seoul (KR)

( * ) Notice: Subject to any disclaimer, the term of this patent is extended or adjusted under 35 U.S.C. 154(b) by 364 days.

(21) Appl. No.: 11/171,326

(22) Filed: Jul. 1, 2005

(65) Prior Publication Data

US 2006/0058490 A1    Mar. 16, 2006

(30) Foreign Application Priority Data

Sep. 15, 2004  (KR) ........................ 10-2004-0073799
Apr. 22, 2005  (KR) ........................ 10-2005-0033621

(51) Int. Cl.
  *C08L 83/00*  (2006.01)
  *C08L 83/02*  (2006.01)
  *B32B 9/00*   (2006.01)
  *C09D 183/04* (2006.01)

(52) U.S. Cl. .................. 524/588; 524/859; 428/447; 106/287.16

(58) Field of Classification Search .................. 428/443
See application file for complete search history.

(56) References Cited

U.S. PATENT DOCUMENTS 5,437,954 A * 8/1995 Saito ........................ 430/108.6

(Continued)

FOREIGN PATENT DOCUMENTS

JP    09-302280    11/1997

(Continued)

OTHER PUBLICATIONS http://www.nissanchem-usa.com/snowtex.php.*

*Primary Examiner*—Randy Gulakowski
*Assistant Examiner*—Robert Loewe
(74) *Attorney, Agent, or Firm*—McKenna Long & Aldridge LLP

(57) ABSTRACT

Disclosed is a coating composition that can provide structural materials having hydrophilicity, excellent self-cleaning property and long service life. The present invention also discloses a method for preparing the composition, a substrate, such as a film or structural exterior material like vinyl sidings, with the applied coating composition, and a method to prepare a substrate with the coating composition. The coating composition has hydroxy group-containing inorganic particles that improve the initial hydrophilicity of conventional coating agents. Additionally, by using two types of inorganic particles having different particles diameters, the coating composition can form a hydrophilic coating layer having a contact angle with water of 30° or less. Additionally, a low boiling point organic solvent having erosive property to a substrate to be coated may be used to allow the application of the coating layer to a conventional production line for structural exterior materials without adding a separate coating line.

10 Claims, 1 Drawing Sheet

U.S. PATENT DOCUMENTS

| | | | |
|---|---|---|---|
| 5,553,630 A * | 9/1996 | Dupuis et al. | 132/202 |
| 6,027,797 A * | 2/2000 | Watanabe et al. | 428/312.8 |
| 6,083,774 A * | 7/2000 | Shiobara et al. | 438/108 |
| 6,165,619 A * | 12/2000 | Ikenaga et al. | 428/448 |
| 6,197,101 B1 | 3/2001 | Matsumura et al. | |
| 6,294,313 B1 * | 9/2001 | Kobayashi et al. | 430/302 |
| 6,335,061 B1 * | 1/2002 | Kanamori et al. | 427/515 |
| 6,337,129 B1 * | 1/2002 | Watanabe et al. | 428/328 |
| 6,440,569 B1 | 8/2002 | Kanamori et al. | |
| 6,576,344 B1 * | 6/2003 | Doushita et al. | 428/426 |
| 6,620,861 B1 * | 9/2003 | Nakatuka et al. | 523/212 |
| 6,656,425 B1 | 12/2003 | Benthien et al. | |
| 6,756,124 B2 * | 6/2004 | Kanamori et al. | 428/447 |
| 6,787,236 B2 * | 9/2004 | Kimura et al. | 428/412 |
| RE38,850 E * | 10/2005 | Ikenaga et al. | 428/448 |
| 7,220,793 B2 * | 5/2007 | Vanier et al. | 524/401 |
| 2001/0030876 A1 * | 10/2001 | Hu et al. | 362/546 |
| 2002/0007006 A1 * | 1/2002 | Kanamori et al. | 524/588 |
| 2002/0124980 A1 * | 9/2002 | Seltzer et al. | 162/158 |
| 2003/0096102 A1 * | 5/2003 | Yoshihara et al. | 428/330 |
| 2003/0096119 A1 * | 5/2003 | Kimura et al. | 428/412 |
| 2003/0167878 A1 * | 9/2003 | Al-Salim et al. | 75/711 |
| 2004/0241456 A1 * | 12/2004 | Yamaki et al. | 428/429 |
| 2005/0019700 A1 * | 1/2005 | Hayakawa et al. | 430/311 |
| 2005/0100737 A1 * | 5/2005 | Shim et al. | 428/411.1 |
| 2005/0227859 A1 * | 10/2005 | Nakabayashi et al. | 502/150 |
| 2005/0233135 A1 * | 10/2005 | Iyer et al. | 428/331 |
| 2005/0266248 A1 * | 12/2005 | Millero et al. | 428/411.1 |
| 2005/0266981 A1 * | 12/2005 | Nakajima et al. | 502/150 |
| 2005/0270628 A1 * | 12/2005 | Miyazaki et al. | 359/296 |
| 2005/0277543 A1 * | 12/2005 | Takahashi et al. | 502/100 |
| 2006/0020052 A1 * | 1/2006 | Tsujimoto et al. | 522/71 |
| 2006/0070551 A1 * | 4/2006 | Kanamori et al. | 106/287.17 |
| 2006/0194067 A1 * | 8/2006 | Beger et al. | 428/447 |
| 2006/0264525 A1 * | 11/2006 | Ohwaki et al. | 522/18 |

FOREIGN PATENT DOCUMENTS

| | | |
|---|---|---|
| JP | 9-302280 A | 11/1997 |
| JP | 2000-212473 | 8/2000 |
| KR | 10-2000-0009647 A | 2/2000 |
| KR | 10-2003-0025713 A | 3/2003 |
| WO | WO 99/52986 | 10/1999 |
| WO | WO 00/05955 A1 | 2/2000 |
| WO | WO 2004/011554 A1 | 2/2004 |

* cited by examiner

FILMS OR STRUCTURAL EXTERIOR MATERIALS USING COATING COMPOSITION HAVING SELF-CLEANING PROPERTY AND PREPARATION METHOD THEREOF

This application claims the benefit of Korean Patent Application Nos. 10-2004-0073799 and 10-2005-0033621, filed Sep. 15, 2004 and Apr. 22, 2005 respectively in Korea, which are hereby incorporated by reference in their entirety.

TECHNICAL FIELD

The present invention relates to a coating composition having self-cleaning property, a substrate such as film or structural exterior material, having excellent self-cleaning property and staining resistance by using the above composition, and methods for producing the same.

BACKGROUND ART

In general, when advertising films and structural exterior materials are exposed to outdoor environments for a long time, there are serious problems in that the films and materials are contaminated by dust, smoke and exhaust gas and discolored by ultraviolet rays. Therefore, it is particularly required for such outdoor films and exterior materials to show physical properties such as self-cleaning property and weather resistance with long-term reliability.

Contamination on surfaces of outdoor films and structural exterior materials mainly results from dust in the air, combustion products such as carbon black and inorganic materials such as clay particles. Generally, contaminants deposited on surfaces of outdoor films and structural exterior materials may be cleaned by rain intermittently, so that the films and materials recover their original conditions. However, in the case of a fine rain, such contaminants are captured by the rain and adhered to the surfaces. Then, such adhered contaminants are present on the surfaces in the form of stripes of dust, contaminants and stains while they dry. Additionally, during the dry season, generation of pollutants in the air increases due to the lack of rain. Any cleaning effect from rain cannot be obtained, resulting in continuous deposition of contaminants. Therefore, coating materials having staining resistance have been conventionally used in order to solve the above problems.

The most widely used method comprises using photocatalyst particles. When the surface of photocatalyst particles is irradiated with ultraviolet rays, the surface shows strong hydrophilicity. Although such a strongly hydrophilic state is maintained for several hours to one-week even if the irradiation is stopped, the surface gradually recovers its original hydrophobic state. Additionally, after the surface recovers the original hydrophobic state, it may regain ultra-hydrophilicity rapidly by irradiating ultraviolet rays again. In other words, intermittent irradiation rather than continuous irradiation is sufficient to maintain surface hydrophilicity and staining resistance. However, such methods using a photocatalyst coating layer are disadvantageous in that they need an additional step of coating a primer on a plastic substrate formed of thermoplastic resin, etc., before coating a photocatalyst, because photocatalysts generally have a possibility for decomposing organic substances.

Additionally, fluoro group-containing water repellent coating materials such as polytetrafluoro ethylene (PTFE) have been considered as preferred staining resistant material. Water repellent coating materials serve to remove dust from a surface layer while water drops on a coating film move downwardly by low surface tension. However, when water drops are too small to be moved by gravity, said water drops are dried along with pollutants, thereby forming local stains.

Further, a method for coating a hydrophilic graft heteropolymer has been suggested. However, the coating film formed by the hydrophilic graft heteropolymer shows a contact angle with water of between 30 and 40 degrees, while conventional mineral dust shows a contact angle with water of between 20 and 50 degrees (*Newspaper Daily Chemical Industry*, 30, 1995). Therefore, such heteropolymers cannot efficiently clean stains and contaminants formed by mineral dust deposited on surfaces. Additionally, because other easily available hydrophilic coatings have a contact angle with water of between 50 and 70 degrees, they are problematic in that they cannot prevent pollution by dust in the city efficiently.

Meanwhile, it is not known that conventional structural exterior materials (for example, vinyl siding) are available as products having self-cleaning property and staining resistance. A staining resistant coating is required in order to provide such properties. However, because vinyl siding materials are generally firm and rigid, it is difficult to produce them in a large scale as general roll-shaped films Additionally, structural exterior materials are produced by a production line comprising an extruder, calibration table (for molding and cooling) and a press (for cutting). The production line optionally further comprises additional supplementary units so that such materials are produced by a production line including an extruder, embossing unit (Embo unit), calibration table (for molding and cooling), punching unit, haul-off (for tension control) and a press (for cutting).

In order to impart staining resistance to a structural exterior material, it is necessary to carry out an additional coating step after the above-mentioned production process. Therefore, an additional coating line is also required, thereby reducing production yield and increasing production cost. In other words, the overall process is inadvisable in both terms of cost and working space.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
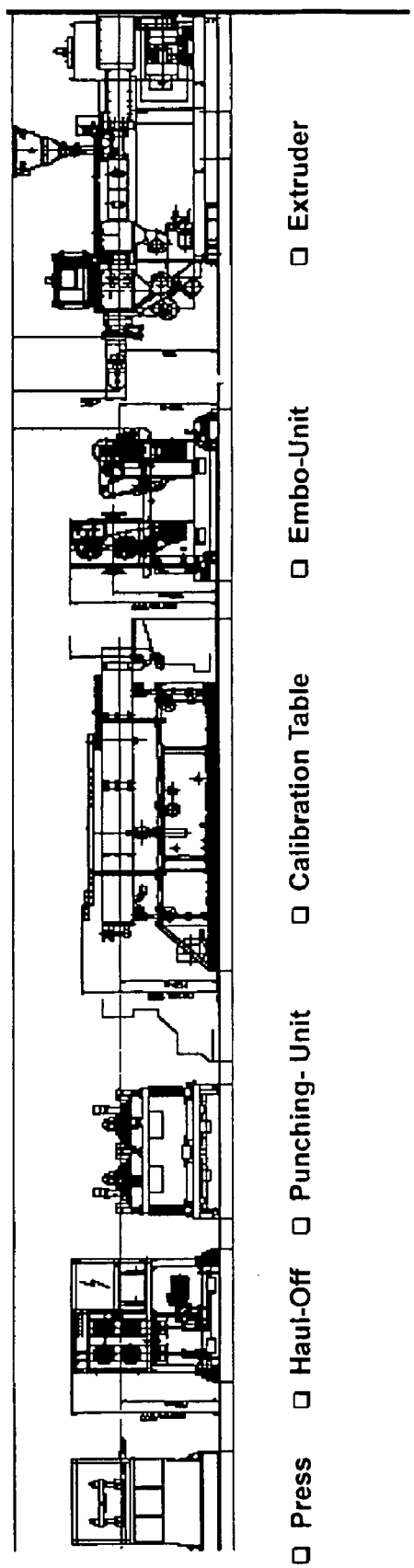
FIG. 1 is a schematic view showing one embodiment of a conventional process for producing structural exterior materials, carried out in a production line comprising an extruder, embossing unit, calibration table (for molding and cooling), punching unit, haul-off (for tension control) and a press (for cutting).

Therefore, the present invention has been made in view of the above-mentioned problems. We have found that a coating composition comprising inorganic particles having hydrophilic hydroxy groups combined with other inorganic particles having a different size contribute to improve hydrophilicity due to their initial hydrophilicity and surface roughness effect, and thus can provide excellent self-cleaning property by removing contaminants adhered to a coating surface efficiently while a water coating layer formed on the surface by rain moves downwardly.

We have also found that when an organic solvent having erosive property to structural exterior materials and a low boiling point is used in the coating composition as solvent, it is possible to apply the coating composition to the above-described production line for structural exterior materials at any steps without adding any separate coating line.

Therefore, it is an object of the present invention to provide a coating composition for imparting excellent self-cleaning property, preparation thereof and a self-cleanable substrate using the above composition.

It is another object of the present invention to provide a method for producing structural exterior materials having staining resistance and self-cleaning property by using the above composition, in a conventional production line for structural exterior materials, without adding any separate production line.

According to an aspect of the present invention, there is provided a coating composition comprising: (a) hydroxy group-containing inorganic particles having an average particle diameter of between 5 and 30 nm; (b) hydroxy group-containing inorganic particles having an average particle diameter of between 0.2 and 5 μm; (c) an organosilane compound represented by the following formula 1; and (d) a solvent. There is also provided a method for preparing the above coating composition.

$$R_nSi(OR')_{4-n} \quad \text{[Formula 1]}$$

wherein R is a C1-C8 aminoalkyl group, glycidoxyalkyl group or isocyanatoalkyl group; R' is a C1-C6 lower alkyl group; and n is an integer of between 0 and 3.

Additionally, the present invention provides a self-cleanable substrate, such as film or structural exterior material, which comprises: (a) a substrate; and (b) a coating layer formed by coating the above coating composition on one surface or both surfaces of the substrate.

Further, the present invention provides a method for producing a structural exterior material comprising the steps of: (a) coating one surface or both surfaces of a structural exterior material with a coating composition before passing the material through a cooling step; and (b) cooling or cutting the structural exterior material coated in step (a).

As used herein, the term "lower" is referred to as an atomic group or compound having 6 or less carbon atoms, preferably having 5 or less carbon atoms.

Lower alkyl groups mean linear or branched lower saturated aliphatic hydrocarbons and may be exemplified by methyl, ethyl, n-propyl, isopropyl, n-butyl, sec-butyl, isobutyl, tert-butyl and n-pentyl.

Hereinafter, the present invention will be explained in more detail.

(1) The coating composition according to the present invention can provide excellent self-cleaning property by using hydroxy group-containing inorganic particles having at least two different sizes in combination.

Recently, most outdoor films and structural exterior materials having staining resistance comprise photocatalyst particles or hydrophilic groups introduced thereto. However, such films and materials require a primer layer capable of protecting a substrate. Otherwise, they have problems of surface stains caused by partial cleaning and short duration.

However, according to the present invention, inorganic particles such as currently used silica or alumina are dispersed in a dispersion medium such as water, alcohol or ketone so that they have hydroxy groups. By doing so, it is possible to improve water film formability and wettability and thus to show hydrophilicity, when water reaches a coating surface.

In addition to the introduction of hydrophilic groups as described above, other inorganic particles having surface roughness, i.e., having an average particle diameter larger than that of currently used hydroxy group-containing inorganic particles are also used to further improve the hydrophilicity of a coating surface by the surface roughness effect.

Further, the coating composition according to the present invention can form a network structure due to the reaction with the organosilane contained in the coating composition, and thus can show hydrophilicity and wear resistance at the same time.

(2) According to the present invention, an organic solvent having erosive property to a substrate to be coated (for example, a structural exterior material) and a low boiling point is used as solvent for the coating composition. Such organic solvents may erode a part of the surface of conventional plastic substrate to form a structure in which the substrate and the coating layer are anchored to each other. Therefore, the self-cleanable coating layer can be present in a stable state and curing of the coating layer can occur with ease, thereby providing excellent staining resistance simultaneously with self-cleaning property for a long time.

(3) Further, the coating composition according to the present invention can be applied to a conventional production line for structural exterior materials at any steps without adding any separate coating line. Therefore, the coating composition is highly economical in terms of cost and working space.

More particularly, as shown in FIG. 1, a conventional production line for structural exterior materials includes an extruder, embossing unit, calibration unit (for molding and cooling), punching unit, haul-off (for tension control) and a press (for cutting). Generally, a coating layer is formed by applying a coating composition on a substrate and drying and curing the coated substrate. Therefore, in order to form a coating layer on a structural exterior material (for example, vinyl siding), an additional coating production line is required, resulting in an increase in cost needed for additional equipments.

According to the present invention, in order to perform a coating step in the above-described production line for structural exterior materials with no need of additional line, a structural exterior material is coated with the coating composition when the material is present at high surface temperature, i.e., before the cooling step, preferably right after the extruding step. Upon coating, the solvent contained in the coating composition and having a low boiling point permits the coating layer to be cured easily with no additional use of a thermal or UV curing agent. Additionally, it is possible to incorporate a coating unit into any step in the above-described steps of the production line and to apply the coating composition at any step.

As the first component forming the coating composition according to the present invention, the first inorganic particles (a) that may be used include inorganic particles currently used and known to one skilled in the art. Non-limiting examples of the first inorganic particles include silica ($SiO_2$), alumina ($Al_2O_3$), $SnO_2$, MgO, CaO or combinations thereof.

The first inorganic particles preferably have an average particle diameter of between 5 and 30 nm, more preferably of between 10 and 20 nm. If the average particle diameter of inorganic particles is less than 5 nm, the coating composition is not cost-efficient due to the high cost needed for raw materials. If the average particle diameter of inorganic particles is greater than 30 nm, such a large particle size may decrease packing density of particles, thereby reducing the strength of a coating film.

The inorganic particles having an average particle diameter of between 5 and 30 nm are present in the coating composition according to the present invention, suitably in an amount of 1-15 wt %, more preferably in an amount of 3-10 wt %, based on 100 wt % of the coating composition. If the content is less than 1 wt %, the strength of a coating film may decrease. On the other hand, if the content is greater than 15 wt %, it is not possible to form a coating film adequately.

As the second component forming the coating composition according to the present invention, the second inorganic particles (b) that may be used include inorganic particles currently used and known to one skilled in the art. The second inorganic particles preferably have an average particle diameter of between 0.2 and 5 μm. It is more preferable that the second inorganic particles have an average particle diameter of between 1.5 and 2 μm in order to improve the hydrophilicity of a coating layer by the above-mentioned surface roughness effect. If the average particle diameter of inorganic particles is less than 0.2 μm, the coating composition is not cost-efficient due to the high cost needed for raw materials. If the average particles diameter of inorganic particles is greater than 5 μm, the coating composition may have a problem related with shelf stability.

The inorganic particles having an average particle diameter of between 0.2 and 5 μm are present in the coating composition according to the present invention, suitably in an amount of 0.05-3 wt % based on 100 wt % of the coating composition. If the content is less than 0.05 wt %, the hydrophilicity of a coating film may decrease, resulting in degradation of self-cleaning property. On the other hand, if the content is greater than 3 wt %, the coating film may be cracked or separated.

The inorganic particles ((a) and (b)) having a different average particle diameter may be used in combination of at least two kinds of particles or more. Additionally, the inorganic particles preferably contain hydrophilic functional groups so as to improve hydrophilicity. For this reason, it is preferable to use the inorganic particles in the form of dispersion in a solvent such as water, alcohol or ketone.

The third component forming the coating composition according to the present invention is the organosilane compound (c) represented by the above formula 1.

Organisilane, which is a hydrophilic silane, can improve the adhesion to a substrate and can be bonded with the inorganic particles having at least two different average particle diameters to form an organic/inorganic hybrid nano network structure, thereby functioning as silane coupling agent.

Organosilanes that may be used include tetraalkoxysilane or silanes having hydrophilic functional groups other than hydroxy groups after hydrolysis. It is preferable to use a silane having one or two hydrophilic functional groups. In the above formula 1, the hydrophilic functional group means "R" in formula 1 and particular examples thereof include a glycidoxyalkyl group, aminoalkyl group, isocyanatoalkyl group, etc. Additionally, the hydrophilic functional group may include a thiol group, amine oxide group, sulfoxide group, phosphate group, sulfate group or salts thereof; or hydrophilic groups of polyoxyethyelne or polyoxypropylene.

More particularly, non-limiting examples of the hydrophilic silane include N-aminoethyl gamma-aminopropyl trimethoxysilane, N-aminoethyl gamma-aminopropyl triethyoxysilane, gamma-aminopropyl trimethoxysilane, gamma-aminopropyl triethoxysilane, gamma-glycidoxypropyl trimethoxysilane, gamma-glycidoxypropyl triethoxysilane, gamma-isocyanopropyl triethoxysilane, gamma-isocyanopropyl trimethoxysilane or mixtures thereof.

The organosilane is used in the coating composition according to the present suitably in an amount of 1-15 wt % based on 100 wt % of the coating composition. If the content is less than 1 wt %, it is not possible to form a coating film. If the content is greater than 15 wt %, hydrophilicity may decrease.

The fourth component forming the coating composition according to the present invention is a solvent (d). The solvent that may be used includes solvents currently used and known to one skilled in the art, such as water, organic solvents and mixtures thereof.

Preferably, the solvent includes a solvent having a solubility parameter ($\delta$) of 9.5 $Mpa^{0.5}$ or less to a substrate to be coated, preferably a general plastic material such as PVC. Such solvents have some erosive property to a coating substrate so that the coating substrate can be bonded firmly with a coating layer. Additionally, the solvent preferably includes at least one organic solvent having an average boiling point (b.p.) of between 60 and 150° C. in order to accomplish curing of the coating layer with ease by virtue of a low boiling point.

Organic solvents that may be used include alcohols having 1-4 carbon atoms such as methanol, ethanol, n-propanol, isopropanol, n-butanol or diacetone alcohol; ketones having 1-5 carbon atoms such as methyl ethyl ketone or methyl isobutyl ketone; acetates such as methyl acetate or ethyl acetate; cellosolves having 4-6 carbon atoms; aromatic solvents having 7 carbon atoms or mixtures thereof, but are not limited thereto.

Although there is no particular limitation in content of the solvent, the solvent is preferably used in an amount of 50-85 wt % based on 100 wt % of the coating composition according to the present invention. If the content of the solvent is less than 50 wt %, insufficient curing may occur. On the other hand, if the content of the solvent is greater than 85 wt %, hydrophilicity may decrease.

The coating composition according to the present invention may further comprise photocatalyst particles.

Photocatalyst particles generate highly active species by light energy with which they are irradiated to accelerate chemical reactions. When a photocatalyst is irradiated with light having energy greater than band gap energy of the photocatalyst, the photocatalyst produces electrons and holes, by which a strong redox reaction can proceed. During the redox reaction, organic chemical substances are decomposed into non-harmful carbon dioxide and water, thereby decreasing the adhesion of floating dust to the surface of a coating layer. Additionally, it is possible to prevent a drop in hydrophilicity caused by the condensation of hydrophilic groups on the coating surface with the lapse of time and thus to maintain hydrophilicity for a long time.

When the surface of photocatalyst particles is irradiated with ultraviolet rays, the surface becomes strongly hydrophilic. Although such a strongly hydrophilic state is maintained for several hours to one-week even if the irradiation is stopped, the surface gradually recovers its original hydrophobic state. Additionally, after the surface recovers the original hydrophobic state, it may regain ultra-hydrophilicity rapidly by irradiating ultraviolet rays again. In other words, intermittent irradiation rather than continuous irradiation is sufficient to maintain the surface in an ultra-hydrophilic state. Therefore, when a substrate to be coated, preferably an advertising film or structural exterior material, is coated with the coating composition of the present invention to which photocatalyst particles are added, the coating surface can be converted into a hydrophilic state by irradiation of sunlight during the daytime and can maintain hydrophilicity continuously.

Non-limiting examples of photocatalyst particles that may be used include anatase type titanium dioxide, rutile type titanium dioxide, stannic oxide, tungsten trioxide, ferric oxide, strontium titanate, ZnO, $SnO_2$, $SrTiO_3$, $WO_3$, $Bi_2O_3$, $Fe_2O_3$ or mixtures thereof. Among those, titania ($TiO_2$) is the most preferred. Because titania has high band gap energy, it needs ultraviolet rays on order to be excited by light. During the excitation, titania does not absorb visible rays and thus not cause color developing caused by a complementary color component.

Suitable light sources for use in excitation of photocatalyst particles include interior lightings such as fluorescent lamps, glow lamps and mercury lamps, sunlight, etc. Particularly, illuminance upon excitation by light is suitably 0.001 $mW/cm^2$ or more, preferably 0.1 $mW/cm^2$.

The photocatalyst particles have an average particle diameter of between 10 and 80 nm, preferably of between 15 and 60 nm. If the average particle diameter is less than 10 nm, the coating composition is not cost-efficient due to high cost of raw materials. If the average particle diameter is greater than 80 nm, there is a problem related with film transparency due to whitening caused by light scattering.

The photocatalyst particles are present in the coating composition according to the present invention, suitably in an amount of between 0.1 and 3 wt % based on 100 wt % of the composition. If the content is less than 0.1 wt %, hydrophilicity and thus self-cleaning property may decrease. On the other hand, if the content is greater than 3 wt %, coating films may be cracked and separated.

Also, the coating composition according to the present invention may further comprise hydrolyzate of an alkoxysilane-functionalized aromatic UV absorbing agent represented by the following formula 2.

The hydrolyzate of alkoxysilane-functionalized UV absorbing agent is used in the coating composition according to the present invention, suitably in an amount of between 1 and 10 wt % based on 100 wt % of the composition. If the content is less than 1 wt %, UV absorbing effect may be deteriorated. If the content is greater than 10 wt %, the coating composition is not cost-efficient.

In addition to the above components, the coating composition according to the present invention may further comprise an acid, curing agent, aqueous polyurethane emulsion or other additives.

The coating composition according to the present invention can be prepared by a conventional method known to one skilled in the art. In a preferred embodiment, the method comprises the steps of: (a) adding inorganic particles having an average particle diameter of between 5 and 30 nm to a dispersion medium and mixing them to form a dispersion of inorganic particles; (b) mixing the dispersion of inorganic particles obtained from step (a) with other inorganic particles having an average particle diameter of between 0.2 and 5 μm, an organosilane represented by the above formula 1, acid and a solvent and reacting the resultant mixture; and (c) adding an organic solvent to the product obtained from step (b) and then reacting the resultant mixture.

(1) First, in order to form the dispersion of hydrophilic hydroxy group-containing inorganic particles having an average particle diameter of between 5 and 30 nm, 1-15 wt % of the inorganic particles are mixed with 15-30 wt % of a dispersion medium.

[Formula 2]

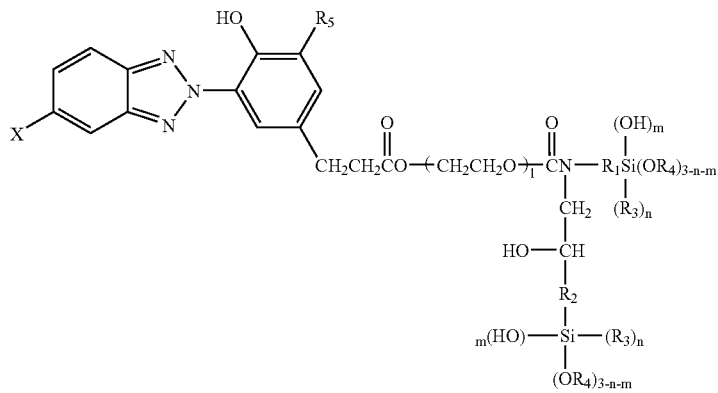

wherein $R_1$ and $R_2$ independently represent a C1-C6 alkyl group;

$R_3$ represents a C1-C6 alkyl group or aryl group;

$OR_4$ represents a methoxy, ethoxy, propoxy, isopropoxy, butoxy or acetoxy group;

$R_5$ represents a C1-C12 alkyl group or aryl group;

X represents a hydrogen atom or halogen atom;

l is an integer of between 5 and 9;

m is an integer of between 1 and 3; and n is an integer of between 0 and 2.

The above hydrolyzate of alkoxysilane-functionalized UV absorbing agent is coupled with the organisilane to maximize compatibility of the coating composition and is bonded chemically with the matrix silane to maintain weather resistance for a long time. Methods for preparing the above hydrolyzate of alkoxysilane-functionalized UV absorbing agent is disclosed in Korean Laid-Open Patent No. 2000-0009647.

The dispersion medium used for forming the dispersion of inorganic particles may include water, alcohols or ketones. Preferably, the dispersion medium is an alcohol such as methanol, because alcohols can be mixed uniformly with an organic solvent used later, have a low boiling point to accomplish curing of a coating layer with ease and can provide hydroxy groups as hydrophilic functional groups. However, other conventional solvents may be used in the scope of the present invention.

The dispersion of hydroxy group-containing inorganic particles has a solid content of between 10 and 40 wt %, preferably of between 15 and 35 wt %.

(2) Then, to 1-15 wt % of the dispersion of hydrophilic hydroxy group-containing inorganic particles having an average particle diameter of between 5 and 30 nm and 15-30 wt % of alcohol, added are 0.05-2 wt % of other inorganic particles having an average particle diameter of between 0.2 and 5 μm, 1-10 wt % of organosilane, 0.001-2 wt % of acid as hydrolysis catalyst and a solvent. The resultant mixture is mixed thoroughly and is subjected to a sol-gel reaction at a temperature of between 20 and 80° C. for 1-48 hours, and then is cooled to room temperature.

The inorganic particles having an average particle diameter of between 0.2 and 5 μm are used so as to control the hydrophilicity and surface roughness of the coating composition. There is no particular limitation in size and kind of the inorganic particles.

The reaction temperature and time are suitably 20-80° C. and 1-48 hours, respectively. Preferably, the reaction temperature and time are 25-60° C. and 5-24 hours, respectively.

In the above reaction mixture, the acid serves as reaction catalyst and non-limiting examples of acid include hydrofluoric acid, nitric acid, hydrochloric acid, acetic acid, sulfuric acid or mixed acids thereof. The acid is used in the coating composition according to the present invention in an amount of between 0.001 and 2 wt % based on 100 wt % of the composition, but the acid content is not limited thereto. It is preferable to control pH of the reaction mixture, to which acid is added, to pH 1-5. If the mixture has a pH value of 6 or higher, the coating composition cannot show adhesiveness to a substrate or may cause a problem related with coating characteristics, such as whitening.

(3) Finally, an organic solvent is added to the reaction product and the mixture is allowed to maintain the reaction for 1 hour at room temperature.

In this step, 1-4 wt % of a heat curing catalyst may be added to the reaction product before adding the organic solvent.

The heat curing catalyst serves to change the structure of an organosilane so that the organosilane can be coupled to inorganic particles to form a nano-network structure. Additionally, the heat curing catalyst permits curing in a short time (90° C., 2 minutes). Generally, because heat curing catalysts are alkaline in nature, they should be added to an acidic dispersion of inorganic particles, in small portions, by using a dilution containing about 10 wt % of a heat curing catalyst in a solvent capable of dissolving the catalyst under suitable stirring conditions so that a local gelling phenomenon can be prevented.

Non-limiting examples of the heat curing catalyst that may be used include alkali metal carboxylates such as sodium acetate, photassium formate; amine carboxylates such as dimethylamine acetate, ethanolamine acetate or dimethylaniline formate; quaternary ammonium carboxylates such as tetramethylammonium acetate, benzyltrimethylammonium acetate or ethanoltrimethyl acetate (choline acetate); amines such as triethylamine, triethanolamine or paraffin; or alkali hydroxides such as sodium hydroxide or ammonium hydroxide.

The heat curing catalyst is used in the coating composition according to the present invention, suitably in an amount of 1-10 wt % based on 100 wt % of the composition. If the content is less than 1 wt %, strength of coating films may decrease. On the other hand, if the content is greater than 10 wt %, the coating composition has poor shelf stability.

Additionally, in this step, in order to improve weather resistance, the hydrolyzate of alkoxysilane-functionalized aromatic UV absorbing agent represented by the above formula 2 may be added to the so-gel reaction product, in an amount of 1-10 wt %, before adding the organic solvent. After the addition of hydrolyzate, it is preferable to agitate the mixture at room temperature for 1-2 hours. Also, 0.001-1 wt % of aminosilane may be further added to the mixture in order to improve hydrophilicity.

In this step, 0.1-3 wt % of dispersion of photocatalyst particles and/or 1-10 wt % of aqueous polyurethane emulsion may be used to increase hydrophilicity, wear resistance and scratch resistance. The dispersion of photocatalyst particles can be prepared by using titania ($TiO_2$) having an average particle diameter of between 10 and 80 nm and a suitable amount of solvent, the dispersion preferably having a solid content of 15 wt %. Additionally, the aqueous polyurethane emulsion that may be used includes an aqueous emulsion polyurethane resin having a polyester backbone. Preferably, the aqueous polyurethane emulsion is used in the coating composition in an amount of 1-10 wt % based on 100 wt % of the composition.

Further, in this step, 0.001-0.5 wt % of a surfactant may be used optionally in order to improve coatability and slipping property. Other additives including various kinds of surfactants, water resistance improvers, anti-oxidants, lubricants, heat absorbing agents, colorants, anti-static agents or plasticizers may be also used. If desired, the coating composition according to the present invention may further comprise additives such as a leveling agent for improving smoothness of films, wetting agent for reducing the surface tension of the composition to improve wettability, UV absorbing agent, level dyeing agent, radiation protecting agent (IR absorbing agent or IR reflective agent) or the like. Surfactants that may be used include at least one of non-ionic surfactants, anionic surfactants, cationic surfactants or amphoteric surfactants.

There is no particular limitation in the form of coating composition prepared as described above. The coating composition is generally used in a liquid form for the convenience of use.

As mentioned hereinbefore, the present invention also provides a self-cleanable substrate, which comprises: (a) a substrate; and (b) a coating layer formed by coating the coating composition according to the present invention on one surface or both surfaces of the substrate.

There is no particular limitation in the kind of substrate, as long as it is neither water nor air. Non-limiting examples of the substrate that may be used include structural exterior materials, tiles, plastics, glass, resins, films, ceramics, metals, concrete, fibers, wood, paper, stone, etc. More particularly, films, resins and structural exterior materials include all plastic materials generally known to one skilled in the art without any limitation. Preferably, films or structural exterior materials are used.

Additionally, although there is no limitation in thickness of the coating layer having self-cleaning property formed on the substrate surface, the coating thickness ranges preferably from 0.01 to 50 μm. If the thickness is less than 0.01 μm, the film hardness is poor. If the thickness is greater than 50 μm, the coating layer has poor flexibility, resulting in generation of cracking in the coating film.

The self-cleanable substrate of the present invention can be produced by a conventional method with no particular limitation. In a preferred embodiment, the self-cleanable substrate can be produced by the method comprising the steps of: coating the coating composition on one surface of both surfaces of a substrate to be coated; and drying the coated substrate.

The coating composition can be coated on a substrate by using any coating method generally known to one skilled in the art. There is no particular limitation in selection of the coating method. Coating methods that may be used include air-knife methods, gravure methods, reverse roll methods, kiss roll methods, doctor blade coating methods, spray coating methods, dip coating methods, brush coating methods, bar coating methods, spin coating methods or combinations thereof. Curing of the coating layer can be performed at a temperature of between 60 and 150° C. for 4 seconds to 2 minutes, but is not limited thereto. If the curing temperature is lower than 60° C., films cannot be dried completely. If the curing temperature is higher than 150° C., coating films and substrates may be deteriorated.

In addition to the above method, the present invention also provides a method for producing a structural exterior material through an extrusion step, which comprises the steps of: (a) coating one surface or both surfaces of a structural exterior material with a coating composition before passing the material through a cooling step; and (b) cooling or cutting the structural exterior material coated in step (a).

It is to be noted that the coating layer of the coated structural exterior material can be dried and cured until it is introduced into cooling water, because the structural exterior material has such a high surface temperature as to reach 100-250° C. Therefore, the coating step is preferably carried out before the cooling steps (for example, in the extruding step, embossing step and molding step), more preferably right after the extruding step where the exterior material has a high surface temperature of 100-250° C. However, the above temperature range does not limit the scope of the present invention. On the contrary, the coating step may be carried out at room temperature. Additionally, it is possible to incorporate a coating unit or a coating step into any step of a conventional production process for structural exterior materials in a manner different from the above-described manner [for example, into any step of a production line comprising an extruder—embossing unit—calibration unit (for molding and cooling)—punching unit—haul-off (for tension control)—press (for cutting)].

As described above, the method for producing a structural exterior material according to the present invention needs not any special heat curing or UV curing step. Additionally, the method needs not a separate coating line and a space for the same. Thus, it is possible to incorporate a coating unit with ease into a currently used production line for structural exterior materials, for example, into a production line for vinyl siding.

The above method can be applied to all plastic substrates produced by extrusion processes. Additionally, there is no particular limitation in the coating composition and it is possible to use a coating composition capable of providing a structural exterior material with desired physical properties, such as staining resistance, self-cleaning property, weather resistance, scratch resistance or other properties. More particularly, it is preferable that the coating composition has a low boiling point of between 60 and 150° C. or a low solubility parameter ($\delta$) of 9.5 Mpa$^{0.5}$ or less, so as to be cured with ease due to a low boiling point and to form a firm coating layer due to erosive property. Therefore, it is preferable to use the coating composition according to the present invention, which comprises an organic solvent satisfying the above requirements. When structural exterior materials are produced by using the coating composition according to the present invention, the coating composition can realize excellent staining resistance and self-cleaning property at the same time.

Coating methods that may be used are the same as described above. The structural exterior material obtained by the above method has a coating layer thickness of between 0.01 and 50 µm, preferably of between 0.5 and 20 µm.

Curing of the coating layer can be accomplished right after the extruding step where the structural exterior material has a surface temperature of between 100 and 250° C., with a curing time of 4 seconds or more after coating. If the curing time is 4 seconds, films cannot be completely dried and cured at a curing temperature of 100° C. or less. If the curing temperature is higher than 250° C., hydrophilicity may decrease.

BEST MODE FOR CARRYING OUT THE INVENTION

Reference will now be made in detail to the preferred embodiments of the present invention. It is to be understood that the following examples are illustrative only and the present invention is not limited thereto.

PREPARATION EXAMPLE

Synthesis of Hydrolyzate of Alkoxysilane-functionalized Aromatic UV Absorbing Agent 30.5 wt % of a benzotriazole-based UV absorbing agent, Tinuvin® 1130 (available from Ciba-Geigy Corp.) was mixed with 42 wt % of acetone and the mixture was introduced into a reactor. The reactor was maintained at an inside temperature of between 55 and 57° C. with stirring. To the mixture, 11.5 wt % of Y-isocyanatopropyl triethoxysilane was added dropwise for 30 minutes and the reaction was continued for 90 minutes at a temperature of between 55 and 57° C. To the resultant mixture, 11 wt % of glycidoxypropyl trimethoxysilane was added and the reaction was continued for 30 minutes at a temperature of between 55 and 57° C. To the resultant solution, 5 wt % of water was introduced and the reaction was continued for 2 hours at a temperature of between 55 and 57° C. to obtain the title hydrolyzate as alkoxysilane-functionalized UV absorbing agent. The hydrolyzate had a solid content of 52%.

EXAMPLES 1-7

Coating Composition, and Manufacture of Advertising Sheet and Structural Exterior Material Using the Same

EXAMPLE 1

1-1. Coating Composition

To a reactor, added were 9 wt % of silica dispersion having a solid content of 30% (MA-ST available from ILSAN Chemical Co.), which contains silica having an average particle diameter of 10-20 nm dispersed in methanol (2.7 wt % of silica and 6.3 wt % of methanol); 0.09 wt % of silica particles having an average particle diameter of 1.7 µm (FineSil, Tokuyama Co.); 0.01 wt % of nitric acid with a concentration of 10%; 1.01 wt % of water; 18 wt % of methanol; and 1.89 wt % of glycidoxypropyl trimethoxysilane. After the mixture was reacted at 50° C. for 24 hours, 10 wt % of EA (ethyl acetate), 54.5 wt % of MEK (methyl ethyl ketone) and 5 wt % of toluene were added in turn. Then, the mixture was stirred for 1 hour to form a coating composition.

1-2. Manufacture of Structural Exterior Material Having Staining Resistance

The coating composition obtained according to Example 1-1 was coated on a vinyl siding product (LG Chem. Ltd., LG Sideon), right after the Embo-Unit (embossing step) in the production line thereof, by using a spray coating method to a dry thickness of 2 µm, thereby providing a vinyl siding having staining resistance.

EXAMPLE 2

Example 1 was repeated to manufacture a vinyl siding having staining resistance, except that the vinyl siding substrate (LG Chem., Ltd., LG Sideon) was coated with the coating composition not at the embossing step but at room temperature.

EXAMPLE 3

3-1. Coating Composition

To a reactor, added were 32 wt % of silica dispersion having a solid content of 20% (ST-C available from ILSAN Chemical Co.), which contains silica having an average particle diameter of 20 nm dispersed in water (6.4 wt % of silica and 25.6 wt % of methanol); 0.56 wt % of silica particles having an average particle diameter of 1.7 μm (FineSil T-32, Tokuyama Co.); 0.05 wt % of nitric acid with a concentration of 67%; 60.62 wt % of water; 4.48 wt % of glycidoxypropyl trimethoxysilane; 0.37 wt % of ethylene diamine as heat curing catalyst; and 1.92 wt % of choline acetate. The mixture was stirred at room temperature for 3 hours to form a coating composition.

3-2. Manufacture of Advertising Sheet

The coating composition obtained according to Example 3-1 was coated on a white PVC advertising sheet (LG Chem. Ltd., Hi-Cast) by using a bar coating method to a dry thickness of 1 μm and the coated sheet was cured at 90° C. for 2 minutes, thereby providing an advertising sheet.

EXAMPLE 4

4-1. Coating Composition

To a reactor, added were 32 wt % of silica dispersion having a solid content of 20% (ST-C available from ILSAN Chemical Co.), which contains silica having an average particle diameter of 20 nm dispersed in water (6.4 wt % of silica and 25.6 wt % of methanol); 0.56 wt % of silica particles having an average particle diameter of 1.7 μm (FineSil T-32, Tokuyama Co.); 0.05 wt % of nitric acid with a concentration of 67%; 40.62 wt % of water; 4.48 wt % of glycidoxypropyl trimethoxysilane; 0.37 wt % of ethylene diamine as heat curing catalyst; and 1.92 wt % of choline acetate. The mixture was stirred at room temperature for 3 hours to form a coating composition. The coating composition was further mixed with 20 wt % of titania dispersion having a solid content of 15% (ST-21 available from Isahara Industries Co.), which contains titania having an average diameter of 40 nm dispersed in water (3 wt % of $TiO_2$ and 17 wt % of water) to provide a final coating composition.

4-2. Manufacture of Advertising Sheet

Example 3-2 was repeated to manufacture an advertising sheet, except that the coating composition according to Example 4-1 was used.

EXAMPLE 5

5-1. Coating Composition

To a reactor, added were 32 wt % of silica dispersion having a solid content of 20% (ST-C available from ILSAN Chemical Co.), which contains silica having an average particle diameter of 20 nm dispersed in water (6.4 wt % of silica and 25.6 wt % of methanol); 0.56 wt % of silica particles having an average particle diameter of 1.7 μm (FineSil T-32, Tokuyama Co.); 4.48 wt % of glycidoxypropyl trimethoxysilane; 0.05 wt % of nitric acid with a concentration of 67%; and 31.5 wt % of water. Then, the mixture was maintained to react at 50° C. for 24 hours. After cooling the reaction mixture, 0.37 wt % of ethylene diamine as heat curing catalyst and 1.92 wt % of choline acetate were added and the resultant mixture was stirred at room temperature for 3 hours. To the resultant solution, added were 0.28 wt % of aminopropylethoxylsilane, 0.19 wt % of a surfactant (BYK 333, BYK Chemie Company) and 4.16 wt % of methyl cellosolve and the mixture was stirred at room temperature for 1 hour. The resultant mixture was further mixed with 20 wt % of titania dispersion having a solid content of 15% (ST-21 available from Isahara Industries Co.), which contains titania having an average diameter of 40 nm dispersed in water (3 wt % of $TiO_2$ and 17 wt % of water), 3 wt % of polyurethane resin having a solid content of 10% (PES A160-P, Takamasu Co.) and 1.5 wt % of the UV absorbing agent obtained according to the above Preparation Example to provide a final coating composition.

5-2. Manufacture of Advertising Sheet

Example 3-2 was repeated to manufacture an advertising sheet, except that the coating composition according to Example 5-1 was used.

EXAMPLE 6

6-1. Coating Composition

Example 5 was repeated to form a coating composition, except that silica particles having an average particle diameter of 3 μm was used instead of silica particles having an average particle diameter of 1.7 μm.

6-2. Manufacture of Advertising Sheet

Example 3-2 was repeated to manufacture an advertising sheet, except that the coating composition according to Example 6-1 was used.

EXAMPLE 7

7-1. Coating Composition

Example 5 was repeated to form a coating composition, except that 1.12 wt % of silica particles having an average particle diameter of 1.7 μm and 30.94 wt % of water were used instead of 0.56 wt % of silica particles having an average particle diameter of 1.7 μm and 31.5 wt % of water.

7-2. Manufacture of Advertising Sheet

Example 3-2 was repeated to manufacture an advertising sheet, except that the coating composition according to Example 7-1 was used.

COMPARATIVE EXAMPLES 1-9

Coating Composition, and Manufacture of Advertising Sheet and Structural Exterior Material Using the Same

COMPARATIVE EXAMPLE 1

Example 1 was repeated to provide a coating composition and to manufacture a vinyl siding coated with the same coating composition, except that silica having an average particle diameter of 10-20 nm was not used.

COMPARATIVE EXAMPLE 2

Example 1 was repeated to provide a coating composition and to manufacture a vinyl siding coated with the same coating composition, except that silica having an average particle diameter of 1.7 μm was not used.

COMPARATIVE EXAMPLE 3

Example 1 was repeated to provide a coating composition and to manufacture a vinyl siding coated with the same coating composition, except that 10% of water and 90% of ethanol were used as solvents.

COMPARATIVE EXAMPLE 4

Example 5 was repeated to provide a coating composition and to manufacture an advertising sheet using the same coating composition, except that 20 wt % of silica dispersion in water that has a solid content of 15% (average particle diameter 40 nm, ST-21 available from Ishara Industries Co.) was not used.

COMPARATIVE EXAMPLE 5

Example 5 was repeated to provide a coating composition and to manufacture an advertising sheet using the same coating composition, except that silica having an average particle diameter of 20 nm was not used.

COMPARATIVE EXAMPLE 6

Example 5 was repeated to provide a coating composition and to manufacture an advertising sheet using the same coating composition, except that the hydrolyzate of UV absorbing agent was not used.

COMPARATIVE EXAMPLE 7

Example 5 was repeated to provide a coating composition and to manufacture an advertising sheet using the same coating composition, except that silica having an average particle diameter of 90 nm was used instead of silica having an average particle diameter of 20 nm.

COMPARATIVE EXAMPLE 8

Example 5 was repeated to provide a coating composition and to manufacture an advertising sheet using the same coating composition, except that 20 wt % of silica dispersion in water that has a solid content of 15% was not used but 40 wt % of dispersion of the same photocatalyst particles in water (6 wt % of $TiO_2$ and 34 wt % of water) was used.

COMPARATIVE EXAMPLE 9

Example 5 was repeated to provide a coating composition and to manufacture an advertising sheet using the same coating composition, except that neither silica having an average particle diameter of 20 nm nor silica having an average particle diameter of 1.7 μm was used.

EXPERIMENTAL EXAMPLE 1

Evaluation for Hydrophilicity and Duration of Hydrophilicity

The following experiment was performed to evaluate the hydrophilicity and duration of hydrophilicity of advertising sheets and structural exterior materials obtained by using the coating composition according to the present invention.

In this example, a contact angle measuring device available from Kruss Co. was used. Each sample was left in the outdoor environment and the surface contact angle of each sample was measured after 1, 3 and 6 months.

1-1. Structural Exterior Materials

The vinyl sidings obtained from Examples 1-2 and Comparative Examples 1-3 were used as samples to perform the above-mentioned experiment. The results are shown in the following Table 1.

After the experiment, it could be seen that the vinyl siding according to Comparative Example 1 obtained by using the coating composition free from inorganic_particles having an average particle diameter of between 10 and 20 nm, as well as the vinyl siding according to Comparative Example 3 obtained by using solvents having a modified composition showed poor hydrophilicity (see, Table 1). More particularly, it is thought that the vinyl siding according to Comparative example 1 has no hydrophilicity resulting from hydrophilic groups on the surface of nano-silica particles. Additionally, it is thought that the vinyl siding according to Comparative Example 3 has too high boiling point or too poor erosive property to form a coating layer on a substrate, thereby showing poor hydrophilicity. Further, the vinyl siding using no silica particles having an average particle diameter of 1.7 μm showed lower hydrophilicity compared to the vinyl siding according to Example 1. It is thought that such lower hydrophilicity results from a lower amount of hydrophilic groups on the surface of silica particles and lower surface roughness.

On the contrary, vinyl sidings coated with the compositions according to Examples 1 and 2 showed the highest initial hydrophilicity as well as excellent duration of hydrophilicity (see, Table 1).

TABLE 1

| Sample | Hydrophilicity and Duration of Hydrophilicity (°) | | |
|---|---|---|---|
| (Vinyl siding) | 1 month | 3 months | 6 months |
| Ex. 1 | 21 | 22 | 22 |
| Ex. 2 | 22 | 23 | 23 |
| Comp. Ex. 1 | 56 | 62 | 68 |
| Comp. Ex. 2 | 27 | 30 | 32 |
| Comp. Ex. 3 | 52 | 55 | 63 |

1-2. Advertising Sheet

The advertising sheets obtained from Examples 3-7 and Comparative Examples 4-9 were used as samples to perform the above-mentioned experiment. The results are shown in the following Table 2.

After the experiment, each of the advertising sheets according to Example 3 and Comparative examples 4, 5 and 9 obtained by using the coating compositions free from photocatalyst particles showed a contact angle with water ranging from 22° to 60°. The other advertising sheets showed a contact angle with water of 5° or less. More particularly, the advertising sheet according to Comparative Example 9 using neither photocatalyst particles nor one of the two kinds of inorganic particles having a different average particle diameter showed lower initial hydrophilicity and duration of hydrophilicity compared to the advertising sheet according to Comparative Example 5 using no photocatalyst particles. The advertising sheet according to Comparative Example 9 showed the lowest initial hydrophilicity and duration of hydrophilicity among the samples tested in this example. This indicates that the factor affecting hydrophilicity and duration of hydrophilicity is two kinds of inorganic particles having a different average particle diameter.

Therefore, it can be seen that the coating composition according to the present invention can provide excellent hydrophilicity and duration of hydrophilicity (see, Table 2).

TABLE 2

| Sample (Advertising Sheet) | Hydrophilicity and Duration of Hydrophilicity (°) | | |
|---|---|---|---|
| | 1 month | 3 months | 6 months |
| Ex. 3 | 21 | 36 | 52 |
| Ex. 4 | <5 | <5 | <5 |
| Ex. 5 | <5 | <5 | <5 |
| Ex. 6 | <5 | <5 | <5 |
| Ex. 7 | <5 | <5 | <5 |
| Comp. Ex. 4 | 22 | 35 | 50 |
| Comp. Ex. 5 | 15 | 14 | 15 |
| Comp. Ex. 6 | <5 | <5 | <5 |
| Comp. Ex. 7 | <5 | <5 | <5 |
| Comp. Ex. 8 | <5 | <5 | <5 |
| Comp. Ex. 9 | 32 | 48 | 59 |

EXPERIMENTAL EXAMPLE 2

Evaluation for Self-Cleaning Property

The following experiment was performed to evaluate self-cleaning property of the advertising sheets and structural exterior materials obtained by using the coating composition according to the present invention.

To perform the experiment, earth and sand having an average particle diameter of 10 μm was dispersed in water to a solid content of 5% and the dispersion was sprayed on each sample of the vinyl sidings and advertising sheets. Then, the treated samples were dried and distilled water was sprayed again on each sample. After 6 months, the amount of earth and sand remaining on the surface of each vinyl sidings and advertising sheet was observed by the naked eye. The samples were graded by amount of contamination with earth and sand into four grades of: excellent (clean), good (slightly stained), insufficient (stained) and poor (highly stained).

2-1. Structural Exterior Materials

The vinyl sidings obtained from Examples 1-2 and Comparative Examples 1-3 were used as samples to perform the above-mentioned experiment. The results are shown in the following Table 3.

After the experiment, it was possible to obtain results similar to the results of the test for hydrophilicity and duration of hydrophilicity as described above. More particularly, the vinyl siding according to Comparative Example 1 obtained by using the coating composition free from inorganic particles having an average particle diameter of 10-20 nm showed poor self-cleaning property. On the contrary, the vinyl sidings according to Examples 1 and 2 showed excellent self-cleaning property (see, Table 3).

TABLE 3

| Sample (Vinyl Siding) | Self-Cleaning property |
|---|---|
| Ex. 1 | Excellent |
| Ex. 2 | Excellent |
| Comp. Ex. 1 | Poor |
| Comp. Ex. 2 | Good |
| Comp. Ex. 3 | Insufficient |

2-2. Advertising Sheets

The advertising sheets obtained from Examples 3-7 and Comparative Examples 4-9 were used as samples to perform the above-mentioned experiment. The results are shown in the following Table 4.

After the experiment, each of the advertising sheets according to Example 3 and Comparative examples 4 obtained by using the coating compositions free from photocatalyst particles showed insufficient self-cleaning property. Additionally, the advertising sheet according to Comparative Example 5 using photocatalyst particles and free from inorganic particles having an average particle diameter of 1.7 μm showed good self-cleaning property. Further, the advertising sheet according to Comparative Example 9 using neither photocatalyst particles nor one of the two kinds of inorganic particles having a different average particle diameter showed poor self-cleaning property. This indicates that the coating composition using inorganic particles having only one average particle diameter shows hydrophilicity due to hydroxy groups but cannot show a significant improvement in hydrophilicity resulting from the surface roughness effect, thereby showing decreased self-cleaning property. On the contrary, the coating composition using two kinds of inorganic particles having a different average particle diameter can provide excellent self-cleaning property (see, Table 4).

TABLE 4

| Sample (Advertising Sheet) | Self-Cleaning property |
|---|---|
| Ex. 3 | Insufficient |
| Ex. 4 | Excellent |
| Ex. 5 | Excellent |
| Ex. 6 | Excellent |
| Ex. 7 | Excellent |
| Comp. Ex. 4 | Insufficient |
| Comp. Ex. 5 | Good |
| Comp. Ex. 6 | Excellent |
| Comp. Ex. 7 | Excellent |
| Comp. Ex. 8 | Excellent |
| Comp. Ex. 9 | Poor |

EXPERIMENTAL EXAMPLE 3

Evaluation for Weather Resistance

The following experiment was performed to evaluate weather resistance of the advertising sheets and structural exterior materials obtained by using the coating composition according to the present invention.

Each of the vinyl sidings and advertising sheets as samples were tested by using a QUV accelerated weather resistance tester (UVB 313 lamp, 60° C.) for 1000 hours to measure a yellow index ($\Delta$) and to observe whether each sample was cracked.

3-1. Structural Exterior Materials

The vinyl sidings obtained from Examples 1-2 and Comparative Examples 1-3 were used as samples to perform the above-mentioned experiment. The results are shown in the following Table 5.

After the experiment, all of the vinyl sidings according to the above Examples and Comparative Examples showed no cracking and relatively good results in terms of yellow index (see, Table 5).

TABLE 5

| Sample (Vinyl Siding) | Weather Resistance | |
|---|---|---|
| | ΔYI | Cracking |
| Ex. 1 | 9.2 | No |
| Ex. 2 | 9.4 | No |
| Comp. Ex. 1 | 9.5 | No |
| Comp. Ex. 2 | 9.2 | No |
| Comp. Ex. 3 | 9.3 | No |

3-2. Advertising Sheets

The advertising sheets obtained from Examples 3-7 and Comparative Examples 4-9 were used as samples to perform the above-mentioned experiment. The results are shown in the following Table 6.

After the experiment, all of the advertising sheets coated with the coating compositions according to Examples 3-7 and Comparative Examples 4-9 showed relatively good results in terms of yellow index (see, Table 6). Particularly, the advertising sheets coated with the coating compositions free from a UV absorbing agent according to Examples 3 and 4 and Comparative Example 6 showed a relatively high yellow index, but they did not show any other signs indicating a decrease in weather resistance.

Therefore, it can be seen that the advertising sheets obtained by using the coating composition according to the present invention has not only excellent self-cleaning property but also excellent weather resistance.

TABLE 6

| Sample (Advertising Sheet) | Weather Resistance | |
|---|---|---|
| | ΔYI | Cracking |
| Ex. 3 | 0.8 | No |
| Ex. 4 | 0.8 | No |
| Ex. 5 | 0.2 | No |
| Ex. 6 | 0.4 | No |
| Ex. 7 | 0.3 | No |
| Comp. Ex. 4 | 0.2 | No |
| Comp. Ex. 5 | 0.3 | No |
| Comp. Ex. 6 | 0.8 | No |
| Comp. Ex. 7 | 0.4 | No |
| Comp. Ex. 8 | 0.3 | No |
| Comp. Ex. 9 | 0.3 | No |

EXPERIMENTAL EXAMPLE 4

Evaluation for Scratch Resistance

The following experiment was performed to evaluate scratch resistance of the advertising sheets and structural exterior materials obtained by using the coating composition according to the present invention.

The vinyl sidings according to Examples 1-2 and Comparative Examples 1-3 were used as samples. Each sample was tested according to the Steel Wool (#0000) test and the number of points where scratching occurs was determined under a load of 200 g. The results are shown in the following Table 7.

After the experiment, it could be seen that the vinyl siding according to Comparative Example 1 obtained by using the coating composition free from silica particles having an average particle diameter of 10-20 nm and the vinyl siding according to Comparative Example 3 obtained by using the coating composition having a modified composition of organic solvents had poor scratch resistance. This indicates that the organic solvent having a high boiling point or insufficient erosive property to a substrate, used in the coating compositions according to Comparative Example 3 does not permit formation of the network structure of a coating layer, thereby providing poor scratch resistance.

On the contrary, the vinyl sidings according to Examples 1 and 2 showed excellent scratch resistance (see, Table 7).

TABLE 7

| Sample (Vinyl Siding) | Scratch Resistance |
|---|---|
| Ex. 1 | 10 times |
| Ex. 2 | 6 times |
| Comp. Ex. 1 | 2 times |
| Comp. Ex. 2 | 5 times |
| Comp. Ex. 3 | 2 times |

EXPERIMENTAL EXAMPLE 5

Evaluation for Hazeness

The following experiment was performed to evaluate hazeness of the coating composition according to the present invention.

The advertising sheets according to Examples 3-7 and Comparative Examples 4-9 were used as samples. Each sample of transparent PVC film was tested according to the ASTM D-1003 method by using a reflectance-transmittance meter (HR-100, Murakami Co.), and the scattering degree of transmitted light to the incident light, i.e., hazeness (% haze) was measured. The results are shown in the following Table 8.

In general, in order to obtain anti-glare effect, low gloss and increased hazeness are required. In the case of outdoor advertising materials, at most 20% of hazeness is permitted considering visual communication.

After the experiment, the advertising sheet of Example 5 coated with the coating composition according to the present invention showed % haze of about 10, while the advertising sheets according to Comparative Examples showed a % haze value of between 5 and 20 (see, Table 8).

TABLE 8

| Sample (Advertising Sheet) | Hazeness (% Haze) |
|---|---|
| Ex. 3 | 9 |
| Ex. 4 | 9 |
| Ex. 5 | 10 |
| Ex. 6 | 34 |
| Ex. 7 | 23 |
| Comp. Ex. 4 | 8 |
| Comp. Ex. 5 | 5 |
| Comp. Ex. 6 | 9 |
| Comp. Ex. 7 | 20 |
| Comp. Ex. 8 | 17 |
| Comp. Ex. 9 | 5 |

EXPERIMENTAL EXAMPLE 6

Evaluation for Gloss

The following experiment was performed to evaluate gloss of the coating composition according to the present invention.

The advertising sheets according to Examples 3-7 and Comparative Examples 4-9 were used as samples. Each sample of transparent PVC film was tested for surface gloss with a gloss meter available from BYK Gardner Co. by measuring a relative value of 60°-reflected light to 60°-incident light. The results are shown in the following Table 9.

In general, surface gloss is graded by glossy (80% or more), semi-glossy (40-80%) and matte (40% or less). In order to impart anti-glare impact, surface gloss preferably ranges from 20% to 40%.

After the experiment, the advertising sheets coated with the coating compositions according to the present invention showed excellent surface gloss.

TABLE 9

| Sample (Advertising Sheet) | Gloss |
|---|---|
| Ex. 3 | 29 |
| Ex. 4 | 29 |
| Ex. 5 | 30 |
| Ex. 6 | 8 |
| Ex. 7 | 9 |
| Comp. Ex. 4 | 15 |
| Comp. Ex. 5 | 75 |
| Comp. Ex. 6 | 30 |
| Comp. Ex. 7 | 20 |
| Comp. Ex. 8 | 22 |
| Comp. Ex. 9 | 74 |

INDUSTRIAL APPLICABILITY

As can be seen from the foregoing, the coating composition according to the present invention, which uses at least two kinds of hydrophilic hydroxy group-containing inorganic particles having a different average particle diameter, can provide excellent self-cleanable coating layer useful for outdoor films and structural exterior materials by virtue of the hydrophilic groups and surface roughness effect. Additionally, because the coating composition according to the present invention uses an organic solvent having a low boiling point, it is possible to perform coating of general plastic substrates, including vinyl sidings produced by a conventional extrusion process, in a conventional production line with no need of additional lines, and thus to decrease the production cost and working space needed for carrying out the production process.

Therefore, the coating composition according to the present invention can impart staining resistance resulting from self-cleaning property to conventional outdoor films and structural exterior materials, so that the films and materials can maintain their clean appearance and that labor and cost needed for cleaning them can be saved. Thus, the coating composition according to the present invention is expected to be widely and efficiently used in the field of outdoor films and structural exterior materials.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A coating composition having self-cleaning property comprising:

(a) 1-15 wt % of first inorganic particles that contain hydroxy group and have an average particle diameter of between 5 and 30 nm;
(b) 0.05-3 wt % of second inorganic particles that contain hydroxy group and have an average particle diameter of between 0.2 and 5 μm;
(c) 1-15 wt % of an organosilane compound represented by the following formula (1);
(d) 50-85 wt % of a solvent;
(e) 0.1-3 wt % of photocatalyst particles;
(f) 1-10 wt % of the hydrolyzate of alkoxysilane-functionalized aromatic UV absorbing agent represented by the following formula (2);
(g) 0.001-2 wt % of an acid;
(h) 1-10 of a heat curling catalyst; and
(i) 1-10 wt % of aqueous polyurethane emulsion;

$$R_n Si(OR')_{4-n} \quad \text{(I)} \qquad \text{[Formula 1]}$$

wherein R is a C1-C8 aminoalkyl group, glycidoxyalkyl group or isocyanatoalkyl group;
R' is a C1-C6 lower alkyl group; and
n is an integer of between 0 and 3;

[Formula 2]

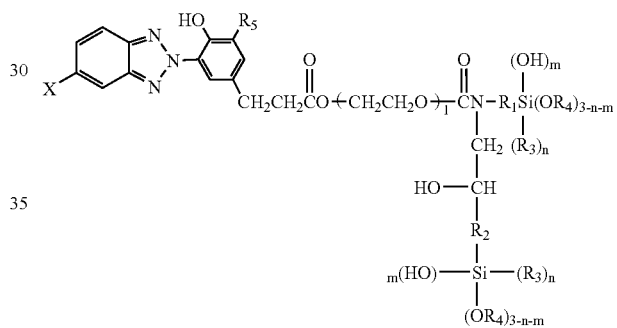

wherein $R_1$ and $R_2$ independently represent a C1-C6 alkyl group;
$R_3$ represents a C1-C6 alkyl group or aryl group;
$OR_4$ represents a methoxy, ethoxy, propoxy, isopropoxy, butoxy or acetoxy group;
$R_5$ represents a C1-C12 alkyl group or aryl group;
X represents a hydrogen atom or halogen atom;
l is an integer of between 5 and 9;
m is an integer of between 1 and 3; and
n is an integer of between 0 and 2.

2. The coating composition according to claim 1, wherein the solvent includes at least one organic solvent having an average boiling point of between 60° C. and 150° C.

3. The coating composition according to claim 1, wherein the solvent includes an organic solvent having a solubility parameter (δ) to plastics of 9.5 $Mpa^{0.5}$ or less.

4. A self-cleanable substrate, comprising:
(i) a substrate; and
(ii) a coating layer formed by coating the coating composition as defined in claim 1 on one surface or both surfaces of the substrate,
wherein the coating composition comprises
(a) 1-15 wt % of first inorganic particles that contain hydroxy group and have an average particle diameter of between 5 and 30 nm;

(b) 0.05-3 wt % of second inorganic particles that contain hydroxy group and have an average particle diameter of between 0.2 and 5 μm;
(c) 1-15 wt % of an organosilane compound represented by the following formula (1);
(d) 50-85 wt % of a solvent;
(e) 0.1-3 wt % of photocatalyst particles;
(f) 1-10 wt % of the hydrolyzate of alkoxysilane-functionalized aromatic UV absorbing agent represented by the following formula (2);
(g) 0.001-2 wt % of an acid;
(h) 1-10 wt % of a heat-curing catalyst; and
(i) 1-10 wt % of aqueous polyurethane emulsion;

   [Formula 1]

wherein R is a C1-C8 aminoalkyl group, glycidoxyalkyl group or isocyanatoalkyl group;
R' is a C1-C6 lower alkyl group; and
n is an integer of between 0 and 3;

[Formula 2]

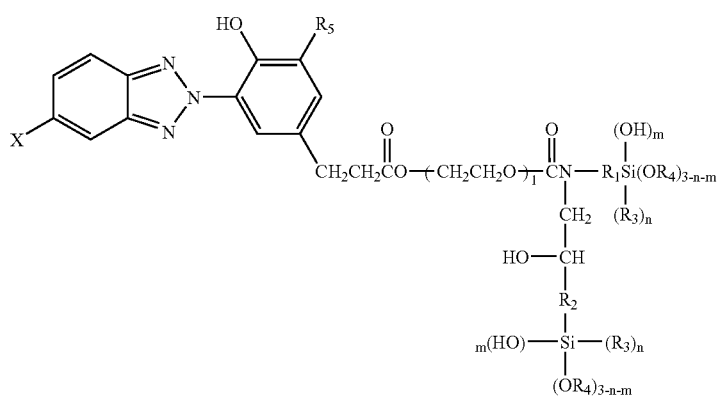

wherein $R_1$ and $R_2$ independently represent a C1-C6 alkyl group;
$R_3$ represents a C1-C6 alkyl group or aryl group;
$OR_4$ represents a methoxy, ethoxy, propoxy, isopropoxy, butoxy or acetoxy group;
$R_5$ represents a C1-C12 alkyl group or aryl group;
X represents a hydrogen atom or halogen atom;
l is an integer of between 5 and 9;
m is an integer of between 1 and 3; and
n is an integer of between 0 and 2.

5. The self-cleanable substrate according to claim 4, wherein the solvent(iv) include at least one organic solvent having an average boiling point of between 60° C. and 150° C.

6. The self-cleanable substrate according to claim 4, wherein the solvent(iv) includes an organic solvent having a solubility parameter (δ) to plastics of 9.5 Mpa$^{0.5}$ or less.

7. The self-cleanable substrate according to claim 4, wherein the substrate is selected from the group consisting of films, structural exterior materials, tiles, plastics, glass, resins, ceramics, metals, concrete, fibers, wood, paper and stone.

8. The self-cleanable substrate according to claim 4, wherein the coating layer has an average thickness of between 0.01 and 50 μm.

9. A method for producing a coating composition having self-cleaning property as claimed in claim 1, which comprises the steps of:
(a) adding the first inorganic particles having an average particle diameter of between 5 and 30 nm to a dispersion medium and mixing them to provide a dispersion of inorganic particles;
(b) mixing the dispersion of the first inorganic particles obtained from step (a) with the second inorganic particles having an average particle diameter of between 0.2 and 5 μm, an organosilane compound represented by the following formula (1), acid and a solvent, and allowing the resultant mixture to react;
(c) adding a heat curing catalyst, hydrolyzate of an alkoxysilane-functionalized aromatic UV absorbing agent represented by the following formula (2) or mixture thereof to the reaction product of step (b) and carrying out reaction; and
(d) adding an organic solvent, aqueous polyurethane emulsion and/or dispersion of photocatalyst particles to the reaction product obtained from step (c):

   [Formula 1]

wherein R is a C1-C8 aminoalkyl group, glycidoxyalkyl group or isocyanatoalkyl group;
R' is a C1-C6 lower alkyl group; and
n is an integer of between 0 and 3;

[Formula 2]

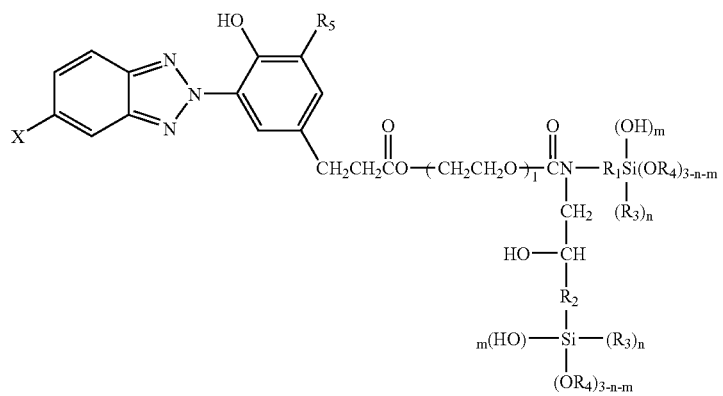

(II)

wherein $R_1$ and $R_2$ independently represent a C1-C6 alkyl group;
$R_3$ represents a C1-C6 alkyl group or aryl group;
$OR_4$ represents a methoxy, ethoxy, propoxy, isopropoxy, butoxy or acetoxy group;
$R_5$ represents a C1-C12 alkyl group or aryl group;
X represents a hydrogen atom or halogen atom;
l is an integer of between 5 and 9;
m is an integer of between 1 and 3; and
n is an integer of between 0 and 2.

10. The method according to claim 9, wherein the dispersion medium or solvent used in steps (a) and (b) is at least one selected from the group consisting of water, alcohols and ketones.

* * * * *